Sept. 27, 1949.    D. O. BRANT    2,483,000
MILK STRAINER
Filed July 16, 1946
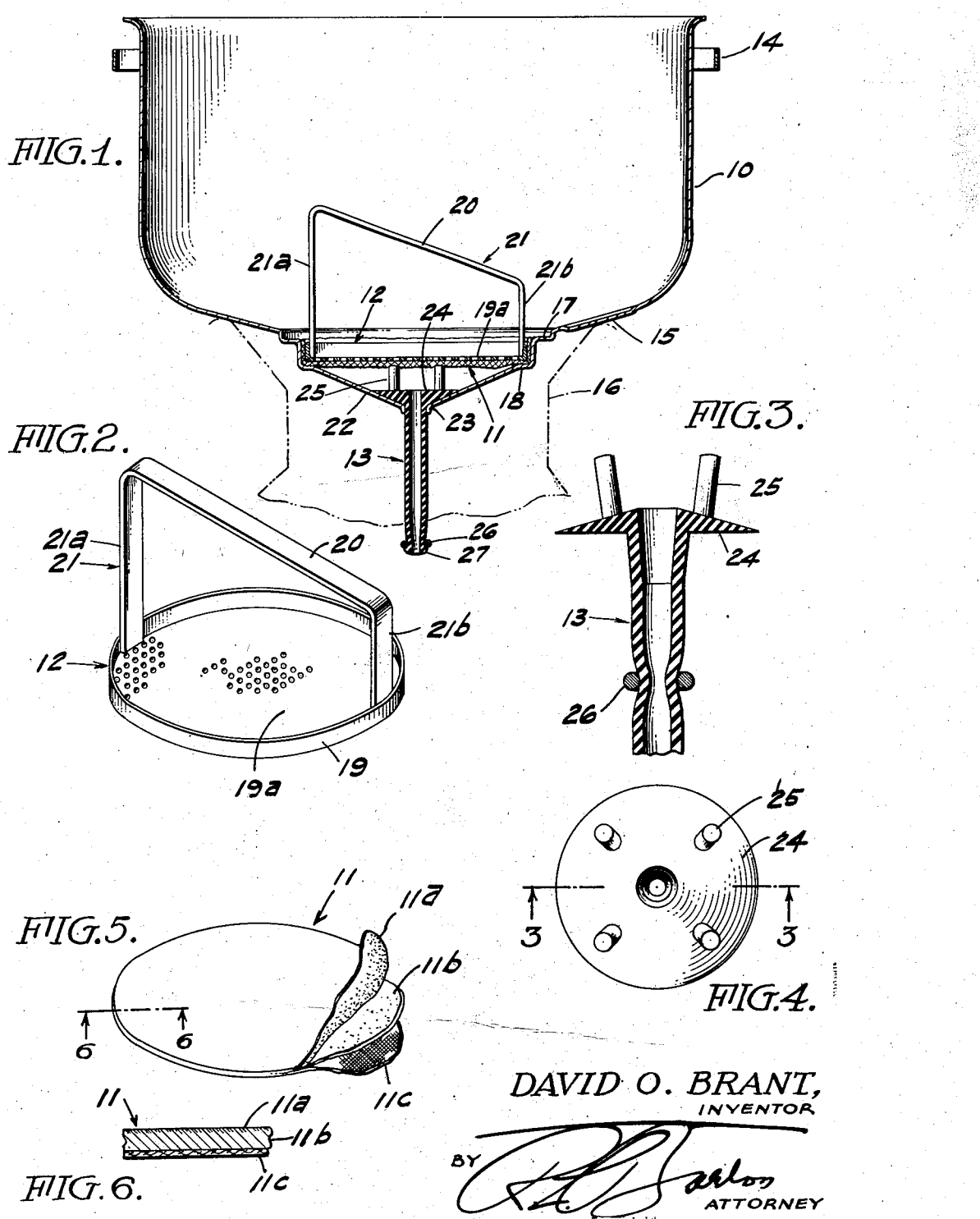
DAVID O. BRANT,
INVENTOR
ATTORNEY Patented Sept. 27, 1949

2,483,000

UNITED STATES PATENT OFFICE 2,483,000

MILK STRAINER

David O. Brant, Beverly Hills, Calif.

Application July 16, 1946, Serial No. 683,917

4 Claims. (Cl. 210—159)

This invention relates to a milk strainer.

Speaking more specifically the invention pertains to a milk strainer of the type described and claimed in my Patent #2,340,302, dated February 1, 1944, and also to an improvement upon the structure disclosed in my pending patent Serial No. 510,359, filed November 15, 1943 which matured in Patent 2,410,010, October 29, 1946.

By the present improvement a better structure is provided for:

(1) Holding the sheet of straining fabric in position in a safer and more satisfactory manner so that it will remain in proper straining position and will be in less danger of having holes formed in it or thin spots produced by the current of milk.

(2) A more efficient means for clamping the marginal portion of the strainer sheet in place.

(3) An improved tubular outlet spout which can be regulated in such a manner as to maintain good straining speed and at the same time prevent the milk within the strainer from bearing down too heavily upon the straining fabric.

By improving the straining structure in the foregoing particulars increased quantities of cleaner milk are delivered from the strainer at a more uniform rate of flow throughout the entire straining period. Also the construction of the strainer is further simplified, cost of manufacture lessened, the strainer is rendered more durable, less frequent repair thereof is necessary, and the time required for changing the removable elements when it is necessary to clean them, is reduced.

It has been found that, in strainer structures, a metal liquid delivery spout, either in the shape of a straight tube, a vena contracta or venturi, is easily bent and broken off; also that it is expensive or difficult to form a bowl and its delivery spout from a single piece of metal, and soldering one part to another is in many sections not permitted by the milk inspectors. By this invention these objections have been overcome by the provision of an improved, detachable rubber delivery spout.

Another specific object is to provide means for converting an elastic tube either into a vena contracta spout or a venturi spout, as desired.

Other objects, advantages and features of invention will hereinafter appear.

Referring to the accompanying drawing, which illustrates a preferred embodiment of the invention, Fig. 1 is a vertical mid-section of the complete strainer, the upper portion of a milk can upon which it is mounted being shown in dotted lines.

Fig. 2 is a perspective view of the combined removable strainer clamp member, and pre-strainer element.

Fig. 3 is a longitudinal mid-section on an enlarged scale of the upper portion of the outlet tube, the plane of section being indicated by the line 3—3 on Fig. 4.

Fig. 4 is a plan view of the structure shown in section in Fig. 3.

Fig. 5 is a perspective view of the fabric laminated straining disc, an edge portion of the upper and of the lower layers thereof being everted to disclose more clearly the interior structure of the disc.

Fig. 6 is a fragmentary section on line 6—6 of Fig. 5.

Referring in detail to the drawing, the principal parts of the structure shown are the milk reservoir or bowl 10, the laminated strainer disc 11 located within the lower portion of said bowl 10, the removable pre-strainer and disc clamp 12, and the flexible, detachable elastic milk delivery tube 13 inserted centrally in the outlet portion of the bowl 10 and forming a delivery spout therefor. The upper part of the bowl 10 is provided with diametrically opposite handle loops 14 and the lower part of the bowl is provided at three or more points with out-pressed ribs 15 designed to engage the upper portion of the milk can 16 and to provide air clearances between them.

Continuing with the description of the bottom portion of the bowl and proceeding toward the central outlet thereof, an upper and horizontal outer step 17 is provided and below this a horizontal inner step 18, there being a substantially vertical wall surrounding said step. When the laminated strainer disc 11 is first put into the bowl its marginal portion overlies the outer step 17. Then the basal rim or ring 19 of the strainer disc clamp 12 is crowded down upon the marginal portion of said disc 11 thus forcing it into the clamped-in-place position shown in Fig. 1. When putting said clamp 12 into place the operator will grasp the inclined top run 20 of the strap metal handle 21, which has a long leg 21a and short leg 21b. Disposing the run 20 of the handle at an inclination enables the operator to reach and manipulate the handle more easily from one side of the bowl. As the clamping member 12 often sticks tight and resists removal, it will be seen that the task is eased by having the handle attached at the outer rim and further increasing the leverage by having the handle long and at a convenient pulling angle, so that one hand can pull on the handle while the other hand can press against the top rim of the bowl, thus permitting a maximum pull.

A metallic, foraminated pre-strainer disc 19a is carried by the rim 19, being shown as an integral part thereof. When the clamping member 12 is in place this disc snugly overlies an upper fragile fabric portion 11a bound together by starch or other suitable material, which holds in place its fibers or filaments during the downflow of the liquid therethrough. Said disc is provided with a middle untreated portion 11b supported by a fabric gauze 11c. When the clamping member 12 is put in place the peripheral portion of the fabric disc 11 is thereby turned up at right angles from its flat surface and is held secure by a jam fit between the rim of the clamping member and the inner surface of the strainer bowl.

Below the lower step 18 the bottom of the bowl 10 is provided with a downwardly tapered bottom 22 having at its lower extremity a central circular discharge opening surrounded by a short or narrow annular lip 23.

An important feature of the invention resides in the provision of the already mentioned elastic outlet tube 13, all except the upper portion of which is of a sufficiently small diameter to be inserted downwardly through the annular lip 23, the upper end portion of said tube having a diametrically expanded head 24 which in mounted position is flat on top but which has its lower side so tapered as to snugly fit against the upper surface of the bottom portion of the bowl, as shown in Fig. 1. From the upper face of the head 24 preferably integral with said head, upstand a plurality of elastic fingers 25, all of said fingers being substantially of the same length and all of them having flat upper ends to abut against the lower side of the strainer disc 11 to aid in supporting said disc.

When the outlet tube 13 is in the unstressed condition shown in Fig. 3 the inner and outer diameters of the upper portion of the tube which occupies a position within the strainer progressively increases to some extent and the fingers 25 incline somewhat away from each other while the head 24 is positioned with its lower surface substantially horizontal; but when the tube 13, after having its lower portion freely inserted downwardly through the discharge opening surrounded by the lip 23, is grasped by the operator below said lip and is forcibly pulled downwardly into its completely seated position, said upper portion of the tube is caused to be pressure contracted by the lip 23, thus producing a liquid-tight seal between the lip and the tube, and at the same time causing the wider surface of the head 24 snugly to overlie the bowl's bottom circumjacent to its discharge opening, and in turn vertically positioning the fingers 25.

In order to control and vary the quantity of liquid delivered from the tube 13 in a given unit of time a constrictor ring 26 having an internal diameter considerably less than the external diameter of the inserted tube is slipped thereover. By varying the position of said ring lengthwise of the tube a considerable difference is caused in the rate of milk out-flow. The external diameter of the lower end of the tube is slightly increased by providing a peripheral bead 27 to guard against slipping off of said ring.

The aforesaid flexible rubber tube 13, which can be readily removed by hand from the strainer bowl, lowers the cost of manufacture, simplifies the strainer structure and prolongs its life and usefulness. Said tube can be contoured from the straight to a vena contracta shape or given the shape of a venturi. Hence, by placing the metal ring 26 in the desired position a variety of tubes, so far as function is concerned, can be produced from the single tube shown.

In the operation of the device, after the bowl 10 has been placed upon a milk can the rubber tube with its headed end uppermost is forced down through the bowl's outlet, before the ring 26 is put in place upon the tube. By grasping the partly inserted tube below the bowl while the bowl is in a canted position on the top of the can, said tube may be jerked into place, bringing its head into a liquid tight relation to the outlet portion of the bowl. The ring 26 may next be placed upon the lower end of the tube 13 and adjusted vertically to the desired position thereon. Thereupon, with the bowl operatively replaced on the can, the fabric strainer disc will be deposited in the bowl with the peripheral part of the disc resting upon the circular step 17. Then the clamping member 12 will be crowded down upon said disc 11 bringing the latter into its clamped-in position shown in Fig. 1, ready for receiving milk to be strained. By proper positioning of the ring 26 lengthwise of the tube 13 the milk pressure can be regulated as to prevent either an upward or downward injurious bulging of the strainer disc 11 during the straining operation.

I claim:

1. In a strainer, a rigid bowl having a bottom part tapering to a reduced opening, a resilient tube detachable connected with the bowl, said tube extending through and depending from the opening in the bottom of the bowl, an annular flange on the upper end of said tube seated on the tapered bottom of the bowl, a filter element mounted in a plane transversely of the tube in the bottom part of the bowl and spaced above the tube flange, and a plurality of fingers rising from said tube flange so as to support the central portion of said filter element.

2. A strainer as claimed in claim 1 wherein said tube flange is integral with the tube and has a diminishing taper radially from its inner to its outer edge in conformity with the bottom tapered part of the bowl, and said fingers are integral with the tube flange for removal as a unit with the tube.

3. In a strainer, a rigid open top bowl having the bottom provided with a dropped annular shoulder and a part tapering downwardly from the shoulder to a central opening, an elastic tube extended through said opening and depending from the bowl, an annular flange on the top end of said tube seated on and tapered in conformity with the tapering part of the bowl so that the top of the flange is in a plane perpendicular to the axis of the tube, a filter supported on said shoulder, and a plurality of fingers formed on and projecting upwardly of said tube flange to support the central part of the filter.

4. A delivery tube for connection with the bottom outlet of a strainer bowl comprising an elastic tube having a radial annular flange integral with the top thereof and integral filter support fingers rising from the flange, said tube having the major length thereof from the bottom end to a point short of the top end substantially cylindrical and the length above said cylindrical part tapered so that the top end of the tube is of greater diameter whereby said tapered part will be contracted when slidably inserted into the outlet of the bowl to a substantially cylindrical form corresponding to the bottom cylindrical part for holding the tube in fluid tight engagement with the bowl.

DAVID O. BRANT.

REFERENCES CITED

The following references are of record in the file of this patent:

UNITED STATES PATENTS

| Number | Name | Date |
|---|---|---|
| 135,391 | Way | Jan. 28, 1873 |
| 343,871 | Van Kammen | June 15, 1886 |
| 807,547 | Fliegel | Dec. 19, 1905 |
| 977,372 | Crane | Nov. 29, 1910 |
| 1,244,205 | Heck | Oct. 23, 1917 |
| 1,667,141 | Crowley | Apr. 24, 1928 |
| 1,896,816 | Gottman | Feb. 7, 1933 |
| 2,078,682 | Parr et al. | Apr. 27, 1937 |
| 2,341,414 | Poliuka | Feb. 8, 1944 |

FOREIGN PATENTS

| Number | Country | Date |
|---|---|---|
| 241,393 | Great Britain | 1925 |
| 518,733 | France | 1921 |